United States Patent [19]
Goto

[11] 4,093,956
[45] June 6, 1978

[54] AUTO-PROCESS CAMERA

[75] Inventor: Toshio Goto, Omiya, Japan

[73] Assignee: Fuji Photo Film Co., Ltd., Minami-ashigara, Japan

[21] Appl. No.: 782,128

[22] Filed: Mar. 28, 1977

[30] Foreign Application Priority Data

Apr. 2, 1976 Japan ................. 51-37911

[51] Int. Cl.² .......................... G03B 17/50
[52] U.S. Cl. ...................... 354/86; 354/288
[58] Field of Search .................. 354/83–86, 354/288, 303, 304

[56] References Cited
U.S. PATENT DOCUMENTS 3,469,514  9/1969  Denk ..................... 354/288
3,872,487  3/1975  Gold ..................... 354/86

FOREIGN PATENT DOCUMENTS 2,522,603  12/1976  Germany .................. 354/86

Primary Examiner—John Gonzales
Attorney, Agent, or Firm—Sughrue, Rothwell, Mion, Zinn and Macpeak

[57] ABSTRACT

Auto-process camera in which a processing roll unit is contained in a separate housing which is detachably mountable on a mount portion of the camera which defines a slit permitting passage of exposed film units from the interior of the camera to the processing roll unit and in which there is provided a spring-loaded covering plate which is automatically moved to cover the film unit passage slit when the roll unit housing is removed and is pushed to a position to uncover the slit when the housing is mounted on the camera, whereby cleaning, etc. of the processing roll unit may be easily effected without risk of exposure of film units to light.

4 Claims, 7 Drawing Figures

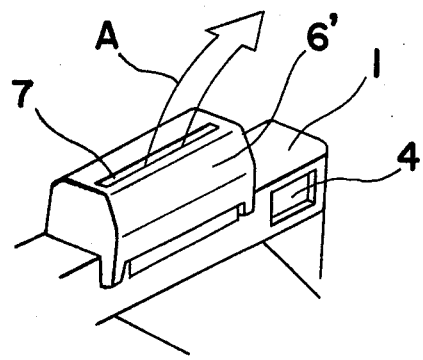
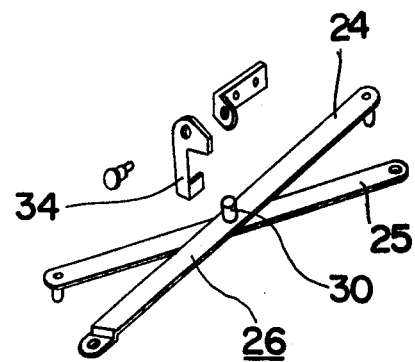
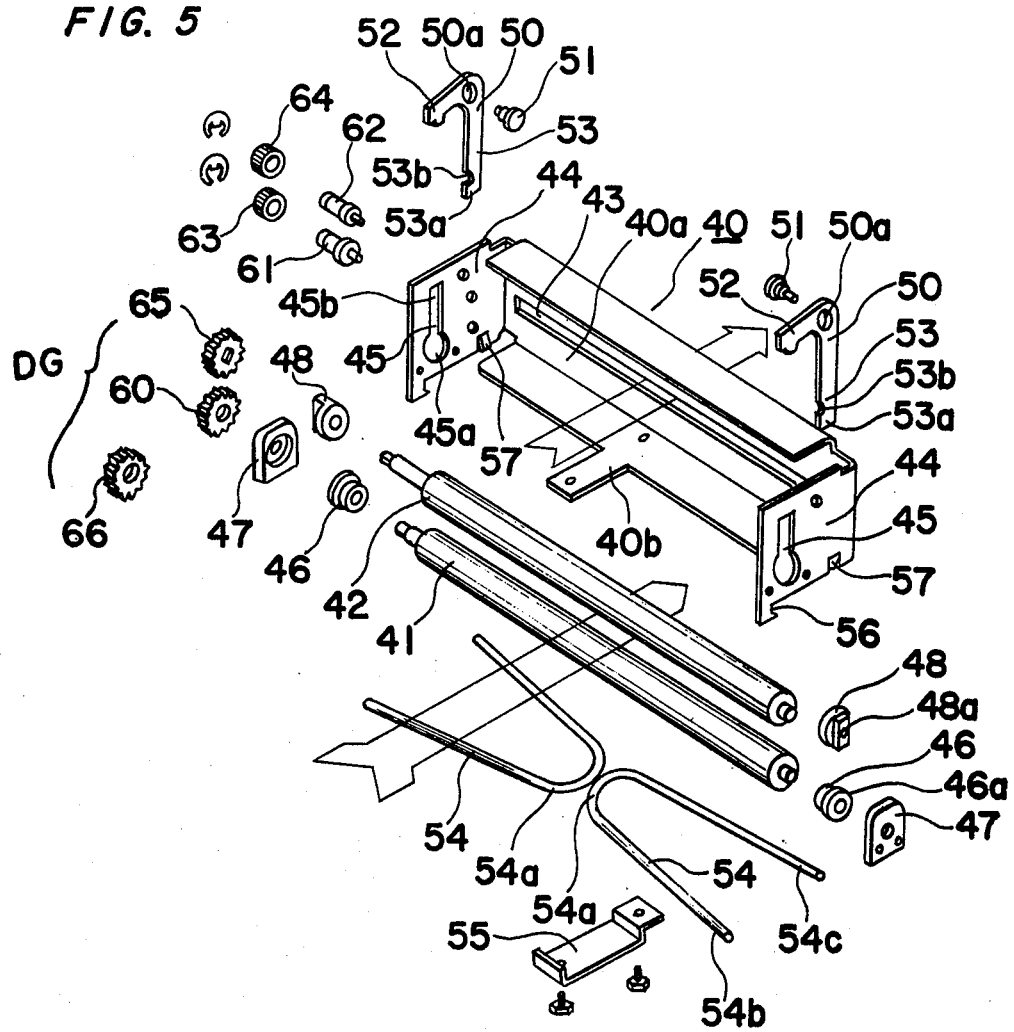

AUTO-PROCESS CAMERA

FIELD OF THE INVENTION

The present invention relates to an auto-process camera. More particularly the invention relates to an auto-process camera having an improved processing roll construction.

BACKGROUND OF THE INVENTION

In cameras of the so-called auto-process type film is provided not in the form of a continuous roll but in the form of individual units, a plurallity of which are contained in a pack or similar container which is loaded in the camera and each of which is independently exposed, moved out of the film unit pack via a slit defined in the pack, and then processed to produce a completed print and moved to the exterior of the camera. Processing of an exposed film unit is usually effected by a processing roll unit through which the film unit passes while being forwarded from the film unit pack to the exterior of the camera, and which breaks open a pod which contains a chemical solution for development and processing of photosensitive film material and is normally included in the film unit itself, and causes this solution to be spread in a viscous layer through the film, whereby a latent image carried by the exposed film unit is developed and a positive, viewable image is obtained. As well as processing exposed film units, the processing roll unit also serves to forward film units to the camera exterior, via an exit slit defined in the camera top or side wall, for example.

A problem with this type of camera is that the processing roll unit, which is a very important part of the camera, requires comparatively frequent maintenance or cleaning. This is partly due to the fact that the roll unit is in direct line with the film unit exit slot defined in a camera wall and hence is exposed to some extent to external dust, but is mainly due to the fact that processing solution sometimes escapes from a film unit when being extruded from the processing solution pod of the film unit and adheres to the processing rolls, since, in order to ensure complete processing of film unit, it is practice to provide in a film unit pod a greater amount of processing solution than is actually required. In conventional auto-process cameras the processing film unit is generally mounted in a portion of the camera which is in direct integral connection to the main body portion of the camera housing the film unit pack and other camera elements. This construction has the disadvantage that access to the processing roll unit is comparatively difficult, and also that if cleaning or repair of the processing roll unit becomes necessary when there are unexposed film units still remaining in the film pack loaded in the camera, these film units become at least partially exposed to external light, and subsequent use thereof to produce photographs results in fogged copies. As an improvement on this construction it has been known to provide an auto-process camera with a processing roll unit which is freely suspended in a portion of the camera main body and may be independently removed from the camera. This construction has the advantage that access to and repair or cleaning of the roll unit are made easier, but, since the roll unit is located intermediate the film unit exit slit defined in a film unit pack and a similar slit defined in an outer wall of the camera, removal of the processing roll unit still results in partial exposure of film units remaining in the camera, which are therefore rendered unuseable.

It is accordingly a principal object of the invention to provide an auto-process camera having a construction which permits easy removal of the processing roll unit for repair or cleaning thereof, but also ensures that film units remaining in the camera are protected from exposure when the processing roll unit is removed.

It is another object of the invention to provide an auto-process camera having a processing roll unit which is detachable and also has a simple construction permitting easy disassembly and re-assembly thereof.

In accomplishing these and other objects, there is provided, according to the present invention an auto-process camera in which the processing roll unit is provided in a detachable housing and the film unit exit slit of a film unit pack loaded in the camera is in line with a slit which is defined in a wall portion of the camera which, when the camera is a completely assembled condition, is an internal wall portion of the camera and which carries a slit closure element which is moved out of line with the slit when the processing roll unit housing is mounted on the camera, and which automatically moves to close the slit, and so protects any remaining film units from exposure, when the processing roll unit is removed.

A better understanding of the present invention may be had from the following full description thereof when read in reference to the attached drawings, in which like numbers refer to like parts, and:

BRIEF DESCRIPTION OF THE DRAWINGS

FIG. 3 is a detail perspective view showing a modification of the camera of FIG. 1;

FIG. 4 is a detail view of main portions of a slit closure element and associated actuation means employed in the camera of FIG. 3;

FIG. 5 is a perspective view of a processing roll unit; and

In the description below, terms indicative of relative position, e.g., forward, rear, left, right, etc., are employed in reference to a camera in a normally upright position for taking a photograph.

DESCRIPTION OF PREFERRED EMBODIMENTS

Figure 1:
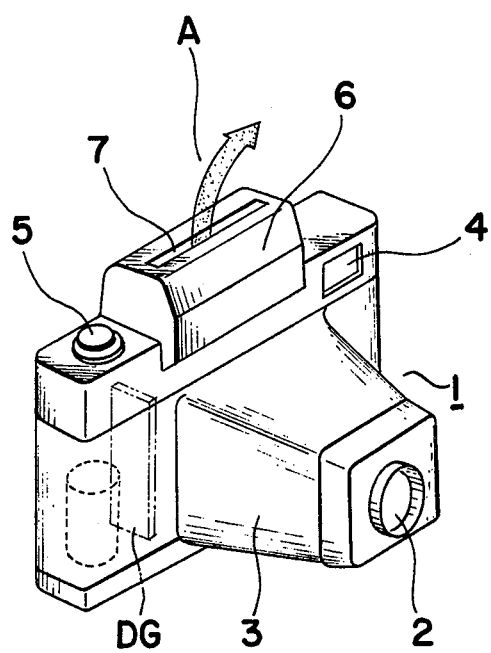
FIG. 1 is a perspective view of an auto-process camera according to the invention.

Referring to FIG. 1, there is shown an auto-process camera comprising a main body portion 1 to the front of which is fixedly or detachably attached a lens mount 3 carrying a taking lens system 2, in an upper side portion of which is installed a viewfinder 4, which carries a shutter button 5 for actuation of a shutter means not shown, and on the upper wall of which is mounted a detachable housing 6, which accommodates a processing roll unit described below. In the upper wall of the housing 6 there is defined a film unit exit slit 7, which is in approximately vertical line with a film unit exit slit defined in a film unit pack loaded in the camera and another slit defined in an internal wall portion of the camera, and via which, successive processed film units may be moved to the exterior of the camera. Inside the camera there is provided a motor which is actuated in conjunction with actuation of the shutter button 5, and which drives a drive gear assembly DG, described below, for actuation of the processing roll unit.

Figure 2:
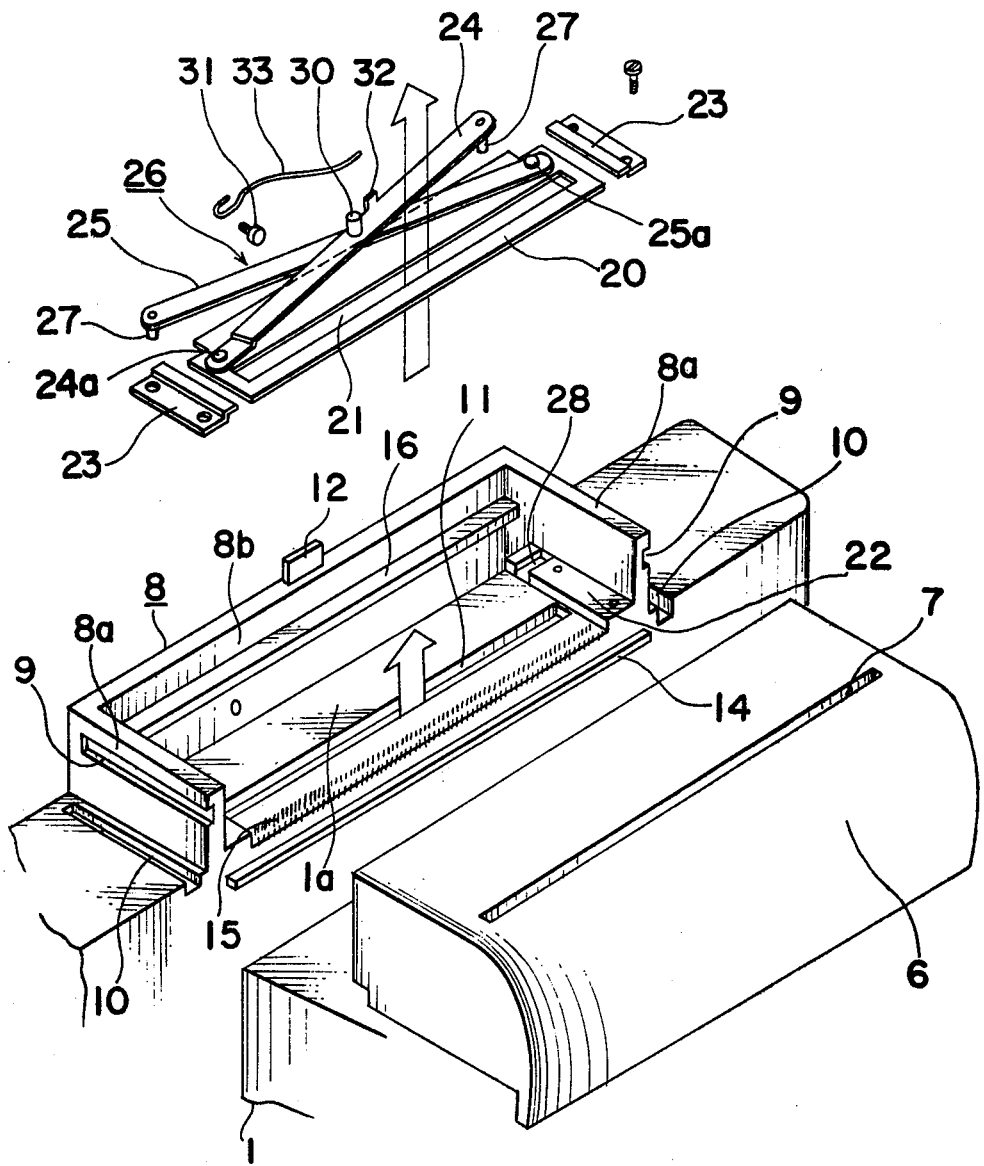
FIG. 2 is a perspective view showing a slit closure element and mounting portions for a detachable processing roll unit.

Referring now to FIG. 2, housing 6 has the general shape of a half-dome having an open rear and bottom, and may be mounted on and fixed to a mount 8 which is integrally attached to and projects upward from a generally central portion of the top wall of the camera main body 1 and comprises a long rear wall 8b and forwardly extending short side walls 8a, which together define the general shape of a rectangular box having an open top and an open forward side. In the upper portion of the outer surface of each side wall 8a there is a dovetail groove 9 which extends from the front edge of the side wall 8a to a point thereof close to the rear wall 8b. In the upper wall 1a of the camera main body 1 there are defined two dovetail grooves 10, each of which is close to and runs parallel to the junction of a mount side wall 8a and the upper wall of the camera main body 1 and extends from the front wall of the camera main body 1 to a point close to mount rear wall 8b. Dovetail portions, not shown, which are defined by inside wall portions of housing 6, may be engaged and slide in grooves 9 and 10, whereby housing 6 may be correctly positioned on mount 8. When housing 6 is mounted on mount 8 internal wall portions thereof (not shown) fit against a bar 14 which extends between the lower portions of the front surfaces of mount side walls 8a, and a ledge 16 which is affixed to and projects forwardly from the inner surface of mount rear wall 8b and extends between side walls 8a, bar 14 and ledge 16 both serving to exclude external light from the housing 6 interior and to fix housing 6 in position. Along bar 14 there is provided a strip 15 of felt, teremp, or similar material to ensure exclusion of light. Housing 6 suitably includes an internal wall portion, now shown, whose lower surface fits onto the upper surface of ledge 16. To hold housing 6 on mount 8 when the camera is held in different positions, there is provided a lock element 12, which is suitably of a type which automatically locks when housing 6 is brought completely into position on housing 8, and may be released by external actuation.

Running along the base of the inner surface of each mount side wall there is a fixedly attached, narrow block 22 whose upper surface is slightly higher than the surface of upper wall 1a of camera main body 1, and in a rear-end portion of which there is defined a groove 28 parallel to mount rear wall 8b.

In the portion of main body upper wall 1a which lies between mount side walls 8a there is defined a film unit passage slit 11, which is in generally vertical line with slit 7 defined in housing 6 when housing is mounted on mount 8, and is a short distance above a film exit slit defined in a film unit pack loaded in the camera.

Slit 11 may be covered or uncovered by a rectangular covering plate 20 which is disposed parallel to camera upper wall 1a, opposite ends of plate 20 being engaged in slide guide elements 23 which are fixedly mounted on blocks 22 and permit only rectilinear front-to-rear movement of plate 20. Parallel to the long axis of plate 20 and near to the front edge thereof there is defined a slit 21 having dimensions equal to those of slit 11. Depending on the position of plate 20, slit 21 is brought into vertical alignment with slit 11, in which case film units may pass unhindered through slits 11, and 21 and slit 7 in housing 6, or the solid portion of plate 20 is brought over slit 11, in which case light is prevented from entering the interior of the camera via slit 11.

Plate 20 is connected to pantagraph element 26 which is constituted by two levers 24 and 25, whose centres are in pivotal attachment and which define the general shape of an X, lever 24 being uppermost. One end 24a of lever 24 is in pivotal attachment to one end of covering plate 20, and one end 25a of lever 25 is in pivotal attachment to the opposite end of plate 20. Studs 27 which are fixed to and extend downwards from the opposite ends 24a and 25a of levers 24 and 25 are engaged in and may slide in opposite grooves 28 defined in blocks 22. An actuation stud 30, whose function is described below, is fixed to and extends upwards from the centre of lever 24. An edge portion of lever 24 which is to the right of stud 30 as seen in the drawing defines a spring catch portion 32. A spring retainer screw 31 is affixed to a point of the inner surface of mount rear wall 8b which, as seen in the drawing, is to the left of the pivotally attached centres of levers 24 and 25. A wire spring 33 which has one end attached to screw 31, is passed around stud 30, and has an opposite end portion attached to catch portion 32, constantly exerts a force to open pantagraph element 26 and so cause plate 20 to be moved to a position in which the solid portion thereof is positioned over slit 11. When housing 6 is mounted on mount 8, an actuation element 34, as shown in FIG. 4, which is provided in a rear portion of the interior of housing 6 engages stud 30 and pushes stud 30 to a rearward position, so closing pantagraph element 26 and causing plate 20 to be slid to a position in which slit 21 is over slit 11.

Referring to FIG. 3, instead of a completely detachable housing 6, there may be provided a housing 6' which has a front end pivotally connected to the camera main body 1, and may be pivoted rearwards to a closed position, or pivoted forwards to an open position, in which, however, it still remains in attachment to the camera main body 1. In this case, the camera upper wall 1a suitably defines slots in which side walls of housing 6' fit, to exclude light when housing 6' is closed.

For either type of processing roll unit, the abovementioned actuation element 34 may be constituted, for example, by a crank lever element, which is fixed to and extends downwards from a housing internal wall portion, and has a plate-like lower end portion which may contact and push stud 30.

Figure 6:
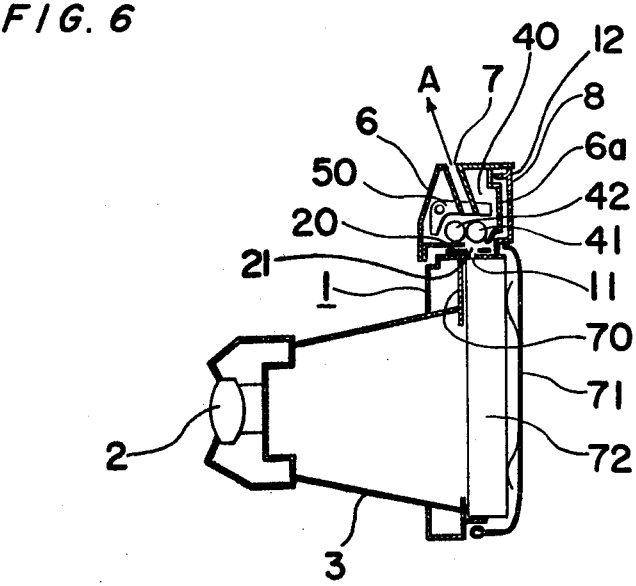
FIGS. 6 and 7 are schematic side views respectively showing the camera of the invention with the processing roll unit mounted and detached.

Referring now to FIG. 5, the processing roll unit comprises a main support element 40 which is fixed to the inner wall of housing 6, supports a pair of processing rolls 41 and 42 in a manner described below, and comprises a rectangular main body portion 40a which is uppermost when housing 6 is mounted and in which there is defined a film unit passage slit 43 and a spring mount portion 40b which extends at right-angles from one long edge of main body portion 40a. When housing 6 is mounted, spring mount portion 40b extends downwards and slit 43 may be vertically below slit 7, or may be at the entrance of an inclined guide portion 7a which leads to slit 7, as shown in FIG. 6.

Still in FIG. 5, in fixed or integral attachment to left and right ends of main body portion 40a there are provided tab plate 44 which extend therefrom in the same direction as mount portion 40b and each of which has defined therein key-hole shaped hole 45. Each end of roll 41 is rotatably supported in a bearing 46 which extends through the round portion of a hole 45 and has a flange portion 46a which lies on the outer surface of the corresponding tab plate 44 and is prevented from turning by a bearing stay element 47. Each end of roll 42 is rotatably supported in a bearing 48 which lies on the inner surface of the corresponding plate 44 and is fixedly attached to a rectangular guide elements 48a which fits into and may slide in the slot portion of the corresponding hole 45, whereby both rolls 41 and 42 may rotate freely and roll 42 may be moved away from or towards roll 41. Roll 42 is prevented from coming into actual contact with roll 41 by contact of slide elements 48a with bearing flange portion 46a.

To a corner portion of the inner surface of each plate 44 there is attached a pin 51 which provides pivotal support to the elbow portion 50a of a lever element 50 comprising a long arm 53 which extends generally parallel to the plane of main body portion and whose outer end 53a is below the lower edge of plate 44 as seen in the drawing, and a short arm 52 which is at right-angles to long arm 53 and extends away from main body portion 40a. The outer end of short arm 52 of each element 50 defines an indented portion which contacts one end of roll 42 or one bearing 48 thereof. The outer end 53a of each long arm 53 defines a notch portion 53b which is engaged by a spring unit which acts to hold roll 42 as close as possible to roll 41 and consists of two generally U-shaped springs 54 which are positioned below and generally flat with respect to spring mount portion 40b with the curved base portions thereof contacting one another and the leg portions thereof extending away from one another towards opposite plates 44. The base portions of springs 54 are held against the lower surface of mount portion 40b by retainer 55 fixedly attached to portion 40b. The end 54b of the forward-side leg of each spring 54 is engaged in a hook portion 56 defined by the lower edge of a plate 44. The end 54c of the other leg of each spring 54 is engaged in the notch portion 53b defined at the end of a lever element 50, whereby springs 54 act to pivot lever elements 50 anticlockwise as seen in the drawing and cause elements 50 to push roll 42 towards roll 41. A limit to anticlockwise movement of lever elements 50 is imposed by stoppers 57 which are affixed to the lower portions of the inner surfaced of plates 44 and are contacted by the long arms 53 of elements 50 after a certain amount of anticlockwise rotation of elements 50 about pins 51.

The abovementioned drive gear train DG comprises a gear 66 which is fixed to the output shaft of a drive motor, extends through a hole, not shown, formed for example in a slide guide element 23, and permanently engages and drives gear 60 which is fixedly mounted on one end of roll 41, and drives first idler gear 63 which is rotatably supported on the outer surface of one tab plate 44 by stepped pin 61 fixedly mounted on the plate 44. First idler gear 63 engages second idler gear 64 which is similarly supported on the outside of the plate 44 by stepped pin 62. Second idler gear 64 is always engaged by follower gear 65, which is fixedly mounted on one end of roll 42.

Figure 7:
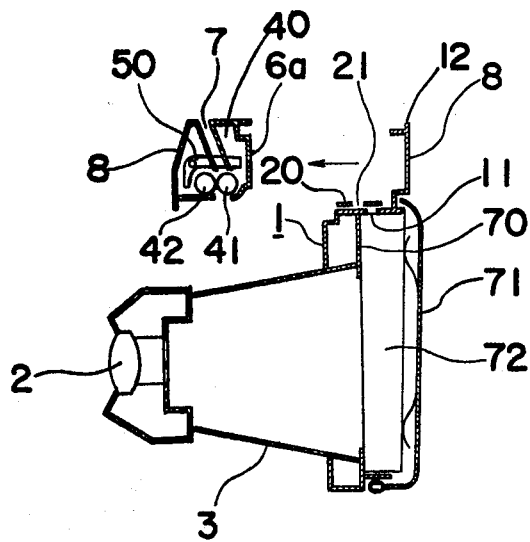

Referring to FIGS. 6 and 7, the above described camera functions as follows. In FIG. 6, housing 6 is mounted on the camera, so causing covering plate 20 to be moved into a position in which slit 21 defined therein is in line with slit 11 defined in camera upper wall 1a, and a film unit pack 72 is loaded into a compartment 70 defined in the camera interior, pack 72 being held in place by an openable rear cover 71, which constitutes a portion of the rear wall of the camera, a foremost film unit in pack 72 being brought into line with a front opening defined the pack, in position for exposure thereof to image-wise light reflected from an external scene. Subsequent to actuation of shutter button 5 and exposure of the foremost film unit in pack 72, the exposed film unit is moved by known means, not shown, out of pack 72, through slits 11 and 21 and into engagement with rolls 41 and 42. Simultaneously forwarding the film unit to and through the exit slit 7, rolls 41 and 42 cause processing solution to be spread through the film unit, roll 42 being moved away slightly from roll 41, counter to the force of springs 54, as the film unit passes through rolls 41 and 42.

Referring to FIGS. 2, 4, and 7, when it is required to clean the processing roll unit, lock means 12 is released and housing 6 is pulled off the camera, resulting in release of pin 30 of pantagraph element 26 by actuation element 34, and consequent movement of covering plate 20 to a position in which the solid portion thereof lies over slit 11.

In this manner, the camera of the invention, while having a very simple construction, permits easy access to the processing roll unit for cleaning or repair thereof, but also ensures that when the processing roll unit is removed any film units remaining in the camera are protected from undesired exposure.

To completely prevent such exposure the disposition and dimensions of actuation element 34 and the abovementioned inner wall portion 6a of housing 6 and the ledge 16 which as shown in FIG. 2 is attached to mount rear wall 8b and is contacted by wall portion 6a, are such that when housing 6 is being mounted on mount 8 actuation element 34 does not contact stud 30 until the edge of wall portion 6a has come into contact with the upper surface of the edge portion of ledge 16.

Although the present invention has been fully described by way of example with reference to the attached drawings, it is to be noted that various changes and modifications are apparent to those skilled in the art. Therefore, unless otherwise such changes and mofidcations depart from the scope of the present invention, they should be construed as included therein.

What is claimed is:

1. In an auto-process camera employing film in the form of individual film units contained in a pack loaded in said camera, forwarding means which subsequent to exposure of each film unit move said film unit separately from said pack via a slit defined in said pack and into engagement with a processing roll unit to cause processing solution to be spread through said film unit to develop a latent image carried by said film unit and simultaneously forward said film unit to the exterior of said camera via an exit slit, the improvement further comprising a mount portion defining enclosure wall portions and a base portion having defined therein a film unit passage slit which is aligned with said slit defined in said film unit pack;

slidable covering plate means provided in said base portion of said mount portion and movable to a first position in which said plate covers said film unit passage slit and to a second position in which said plate uncovers said slit; and positioning means connected to said covering plate means and being actuable to move said covering plate to said first position or to said second position.

2. An auto-process camera as claimed in claim 1, further comprising spring means connecting to said positioning means and exerting thereon a constant force to cause said positioning means to bias said covering plate means to said first position.

3. An auto-process camera as claimed in claim 1, wherein said housing which contains said processing roll unit, is detachably mounted on said mount portion, whereby said processing roll unit may be freely removed from or mounted on said camera, said housing has an outer wall portion defining said exit slit; and wherein said camera further comprises an actuation element provided in said housing and which when said housing is mounted on said mount portion contacts said positioning means, for acting counter to said spring means to cause said positioning means to move said covering plate means to said second position.

4. In an auto-process camera employing film in the form of individual film units contained in a pack loaded in said camera, forwarding means which subsequent to exposure of each film unit move said film unit separately from said pack via a slit defined in said pack and into engagement with a processing roll unit to cause processing solution to be spread through said film unit to develop a latent image carried by said film unit and simultaneously forward said film unit to the exterior of said camera via an exit slit, the improvement comprising a mount portion defining enclosure wall portions and a base portion having defined therein a film unit passage slit which is aligned with said slit defined in said film unit pack;

slidable covering plate means provided in said base portion of said mount portion and movable to a first position in which said plate covers said film unit passage slit to a second position in which said plate uncovers said slit;

positioning means connected to said covering plate means, and being actuable to move said covering plate to said first position or to said second position, and comprising a fixedly attached stud portion contactable by an external element;

spring means connected to said positioning means and exerting thereon a constant force to cause said positioning means to bias said covering plate means to said first position;

a housing which contains said processing roll unit, and being detachably mounted on said mount portion, whereby said processing roll unit may be freely removed from or mounted on said camera, and said housing having an outer wall portion defining said exit slit; and an actuation element provided in said housing said and which when said housing is mounted on said mount portion contacts and presses on said stud projection portion of said positioning means and acts counter to said spring means to cause said positioning means to move said covering plate means to said second position.

* * * * *